(12) United States Patent
Petry-Johnson et al.

(10) Patent No.: US 8,555,838 B2
(45) Date of Patent: Oct. 15, 2013

(54) ENGINE WITH STUB SHAFT SUPPORTED CAM GEAR AND MACHINE USING SAME

(75) Inventors: Travis Thomas Petry-Johnson, Peoria, IL (US); Philip Christopher Millward, Novi, MI (US); Ryan Michael Heinbuch, Novi, MI (US)

(73) Assignee: Caterpillar Inc., Peoria, IL (US)

( * ) Notice: Subject to any disclaimer, the term of this patent is extended or adjusted under 35 U.S.C. 154(b) by 495 days.

(21) Appl. No.: 12/957,884

(22) Filed: Dec. 1, 2010

(65) Prior Publication Data
US 2012/0138003 A1 Jun. 7, 2012

(51) Int. Cl.
*F01L 1/02* (2006.01)

(52) U.S. Cl.
USPC ...................................... 123/90.31

(58) Field of Classification Search
USPC ......... 123/90.31, 90.34, 90.27, 195 A, 195 R, 123/179.25, 198 A, 198 R, 312; 475/159; 476/19; 74/410, 579 F, 587, 606 R
See application file for complete search history.

(56) References Cited

U.S. PATENT DOCUMENTS

| | | | |
|---|---|---|---|
| 182,936 A | 7/1922 | Lavoie | |
| 1,536,092 A * | 5/1925 | Guy et al. | 74/410 |
| 324,564 A | 1/1930 | Anonima | |
| 1,743,173 A * | 1/1930 | Warner | 123/54.4 |
| 3,732,855 A * | 5/1973 | Jackson | 123/90.31 |
| 4,671,223 A * | 6/1987 | Asano et al. | 123/90.31 |
| 4,955,335 A * | 9/1990 | Jingu et al. | 123/90.31 |
| 5,058,458 A * | 10/1991 | Odai | 74/665 GE |
| 5,355,850 A * | 10/1994 | Gullberg | 123/90.31 |
| 5,690,568 A * | 11/1997 | Watson | 474/85 |
| 5,816,968 A * | 10/1998 | Watson | 474/84 |
| 5,924,334 A * | 7/1999 | Hara et al. | 74/568 R |
| 6,079,385 A * | 6/2000 | Wicke | 123/198 R |
| 6,109,227 A * | 8/2000 | Mott | 123/90.31 |
| 6,199,522 B1 | 3/2001 | Regueiro | |
| 6,234,127 B1 * | 5/2001 | Simpson et al. | 123/90.31 |
| 6,363,918 B2 * | 4/2002 | Håkansson et al. | 123/509 |
| 6,763,787 B2 | 7/2004 | Hallenstvedt et al. | |
| 7,156,060 B2 * | 1/2007 | Oshita et al. | 123/90.31 |
| 7,270,097 B2 * | 9/2007 | Purcilly et al. | 123/90.31 |
| 7,380,530 B2 * | 6/2008 | Schafer et al. | 123/90.17 |
| 7,384,360 B2 * | 6/2008 | Ploetz et al. | 475/159 |
| 2008/0152511 A1 | 6/2008 | Enokijima et al. | |

FOREIGN PATENT DOCUMENTS

DE 2442609 A1 3/1976

* cited by examiner

*Primary Examiner* — Kenneth Bomberg
*Assistant Examiner* — Jason T Newton
(74) *Attorney, Agent, or Firm* — Liell & McNeil

(57) ABSTRACT

In one aspect, a machine includes an engine supported on a machine body. The engine includes a housing and a gear train that includes a crank gear meshed with a cam gear that is meshed with at least one powered gear. The cam gear is attached to a cam shaft by a drive coupler. The cam shaft is rotationally supported in the housing on a plurality of bearings, and the cam gear is rotationally supported on a stub shaft with an inner surface that is out of contact with the cam shaft. The stub shaft is attached to the housing of the engine.

18 Claims, 5 Drawing Sheets

ENGINE WITH STUB SHAFT SUPPORTED CAM GEAR AND MACHINE USING SAME

TECHNICAL FIELD

The present disclosure relates generally to engine gear trains, and more particularly to a directly driven cam gear that drives rotation of a cam shaft and at least one powered gear.

BACKGROUND

In some engine applications, the engine is required not only to provide power to a conveyance to move the machine, but also to other systems of the machine. For instance, in large track type tractors and mining trucks, the engine powers hydraulic pumps to operate implements (ripper, blade) of a tractor or a dump cylinder for moving the dump bed of a mining truck. While there are many ways to configure an engine to provide power to hydraulic pumps, all gears of the gear train and all rotating shafts (e.g. crank shaft, cam shaft) must be adequately rotationally supported in order to avoid unacceptable stress concentrations and/or premature failure of one or more engine components. Spatial constraints in and around an engine make it problematic to arrange a gear train to properly distribute power from a crank shaft to the various pumps (e.g. lubrication pump, power take off pumps, fuel system pumps, etc.) and cam shaft that are necessary for proper operation of the engine and machine, while avoiding stress concentrations that could shorten engine life.

The present disclosure is directed to one or more of the problems set forth above.

SUMMARY OF THE DISCLOSURE

In another aspect, a compression ignition engine includes a housing. A gear train includes a crank gear meshed with a cam gear that is meshed with at least one powered gear. The cam gear is attached to the cam shaft by a drive coupler. The cam shaft is rotationally supported in the housing on a plurality of bearings. The cam gears rotationally supported on a stub shaft with an inner surface out of contact with the cam shaft but the stub shaft is attached to the housing. The stub shaft includes a thrust bearing face positioned for contact with the cam shaft thrust surface. The at least one powered gear is operably connected to drive a pump. A majority of the power transferred to the cam gear from the crank gear is transmitted to the at least one powered gear to drive the pump, and a minority of the power is transmitted to drive rotation of the cam shaft.

In still another aspect, power is transferred from a crank gear to a cam gear by directly meshing the cam gear with the crank gear. A majority of the power transmitted from the crank gear to the cam gear is transferred to drive rotation of at least one powered gear, whereas a minority of the power is transmitted to drive rotation of the cam shaft. A thrust bearing surface of the stub shaft makes thrust bearing contact with a thrust surface of the cam shaft, during certain operating conditions of the machine.

DETAILED DESCRIPTION

Figure 1:
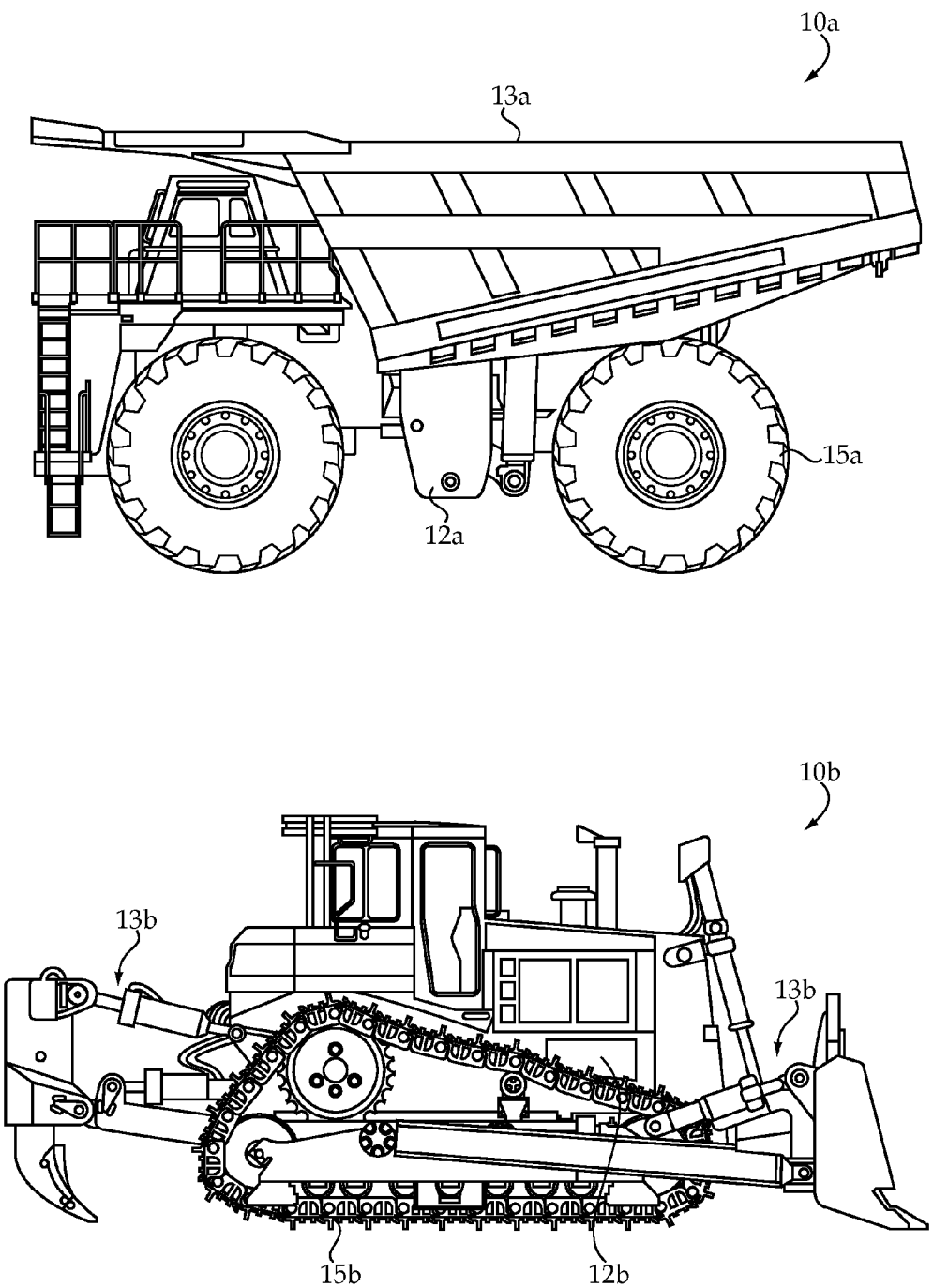
FIG. 1 is a side view of two different machines according to the present disclosure.
Figure 2:
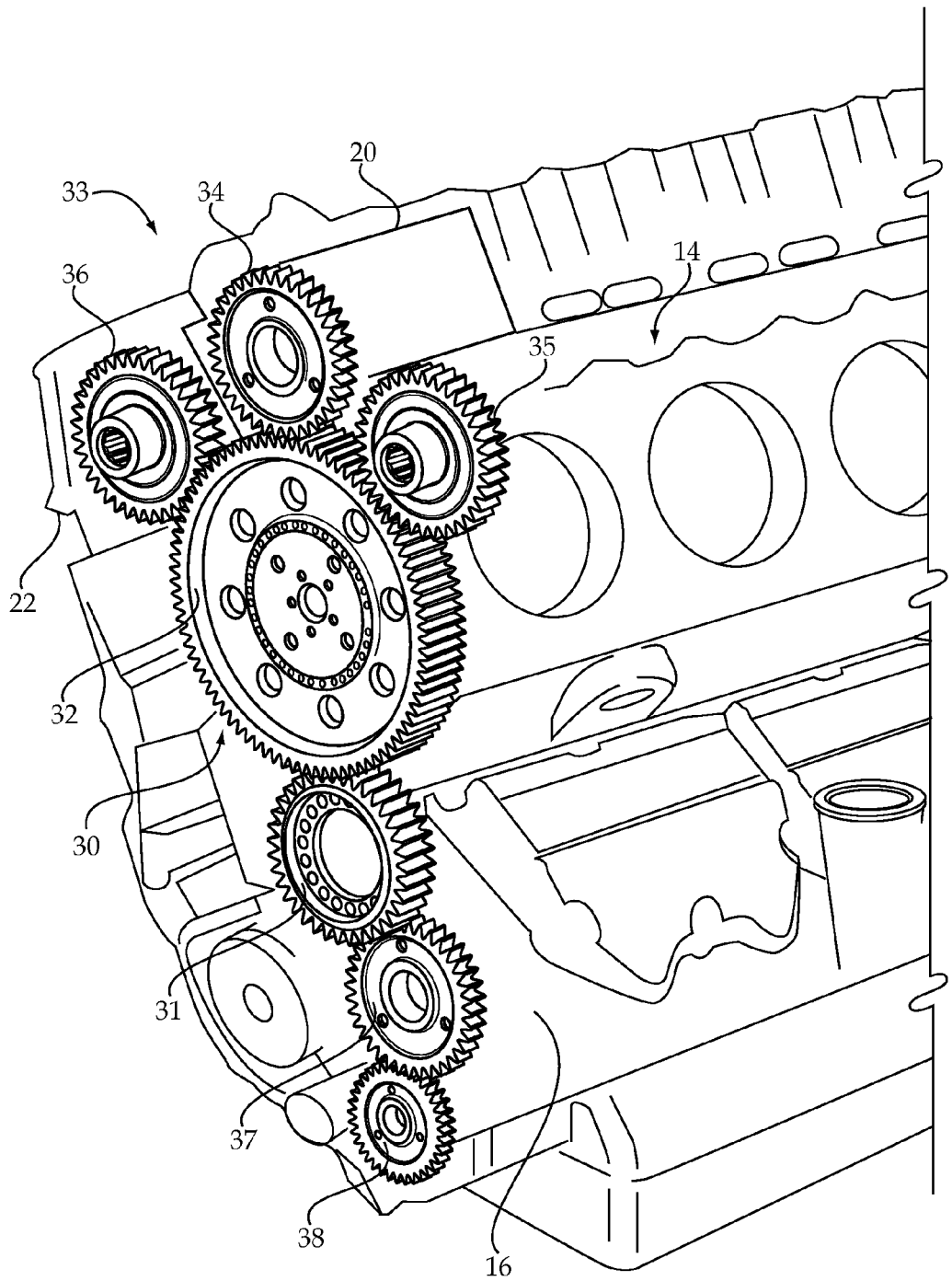
FIG. 2 is a perspective diagrammatic view of a portion of an engine used to power the machines of FIG. 1.

Referring to FIGS. 1 and 2, a machine according to the present disclosure might be a relatively large mining truck 10a or a large track type tractor 10b, either which may be powered by a relatively large compression ignition engine 14. Machines 10 according to the present disclosure may be characterized by a machine body 12 that supports the engine 14, which powers a conveyance 15 (e.g. wheels, tracks, or propeller etc.) and a hydraulically powered implement(s). In the case of mining truck 10a, the implement might be a dump bed 13a that is lifted to a dumping position by one or more hydraulic cylinders that receive pressurized hydraulic fluid from a pump driven by engine 14. In the case of track type tractor 10b, the implements include a ripper and blade 13b that each include a pair of hydraulic cylinders that receive pressurized hydraulic fluid from a pump powered by the engine 14.

Referring specifically to FIG. 2, compression ignition engine 14 may include a housing 16 that supports a gear train 30 in which a crank gear 31 is meshed to drive rotation of a cam gear 32. The crank gear 31 is driven by an attached crank shaft (not shown). The cam gear 32 drives rotation of a pair of power take off gears 35 and 36, as well as a fuel pump gear 34. Each of the power take off gears 35 and 36 are drive coupled to a hydraulic pump 22 to provide pressurized hydraulic fluid to implements 13 of machine 10 (FIG. 1). The fuel pump gear 34 is drive coupled to a high pressure common rail pump 20, which supplies a high pressure fuel to a common rail (not shown) that is fluidly connected to individual fuel injectors (not shown) of engine 14 via individual branch passages (not shown). Thus, gears 34-36 can be considered as powered gears according to the present disclosure because these gears power pumps and are driven to rotate by cam gear 32. Gear train 30 also includes an oil pump idler gear 37 that is meshed with crank gear 31 and also meshed to drive rotation of a lubrication oil pump gear 38, which is connected to a lubrication pump (not shown).

Figure 3:
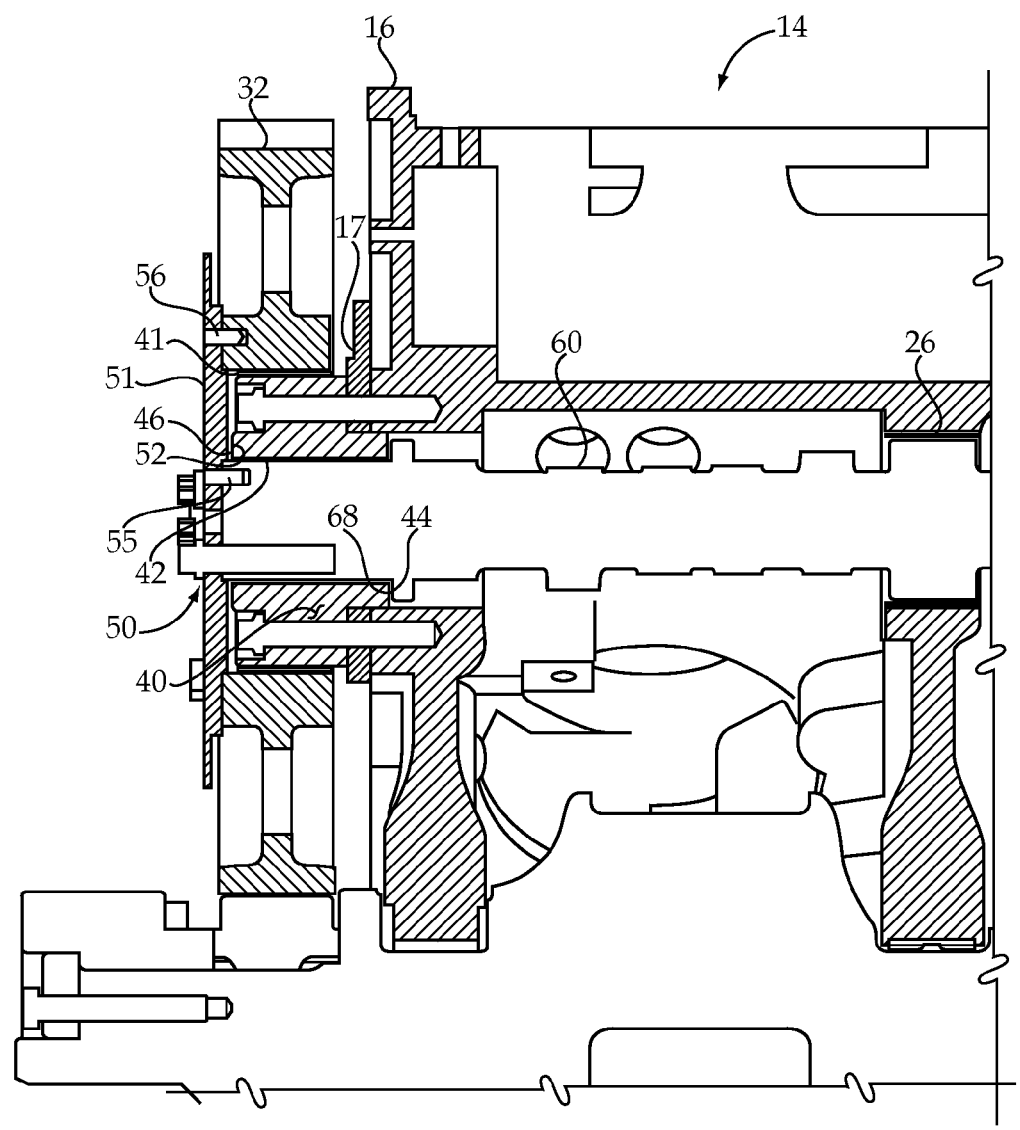
FIG. 3 is a partial sectioned side view through the cam gear and a portion of the engine of FIG. 2.
Figure 8:
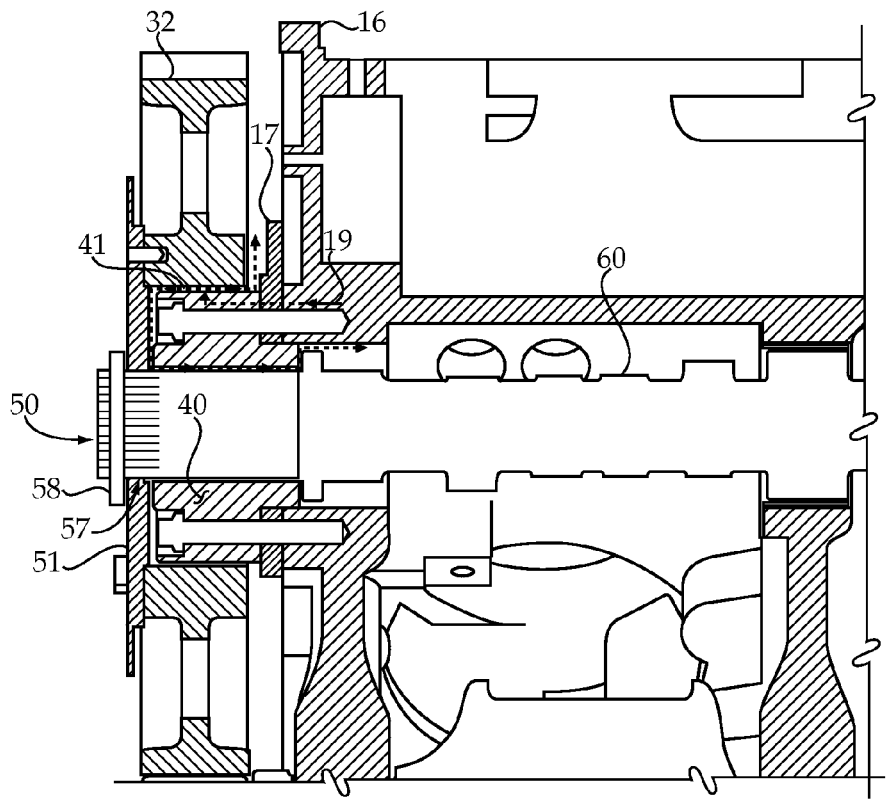
FIG. 8 is a sectioned side view of an alternative spline drive coupler version of the present disclosure.

Referring now in addition to FIG. 3, those skilled in the art will appreciate that because the powered gears 33 are driven to rotate by cam gear 32, some consideration may need to be directed to ensuring that the cam gear 32 and the underlying cam shaft 60 have adequate bearing support. This may be a concern because the powered gears 33 may place a resultant force on the cam gear/cam shaft assembly that is transverse to the cam gear/cam shaft axis of rotation. Thus, FIG. 3 is useful in showing how these concerns are addressed in the engine 14 of the present disclosure. In particular, cam gear 32 is attached to cam shaft 60 by a drive coupler 50. In the FIG. 3 embodiment, drive coupler 50 includes a drive plate 51 that is bolted to both the cam shaft 60 and cam gear 32. FIG. 8 shows an alternative embodiment in which the drive coupler 50 includes a drive plate 51 that is drive coupled to cam shaft 60 by a spline 57 that is held in place by a retaining ring 58 (FIG. 8). Cam shaft 60 is supported for rotation on a plurality of bearings 26 (only one shown) that are at spaced apart locations in housing 16 in a conventional manner. Cam gear 32 is supported for rotation on a stub shaft 40 that is attached to housing 16 by an array of bolts. Cam gear 32 and stub shaft 40 define a bearing contact area 41. Stub shaft 40 includes an inner surface 42 that is out of contact with cam shaft 60. However, stub shaft 40 includes a thrust bearing face 44 that makes bearing contact with a cam shaft thrust surface 68 of cam shaft 60 under certain operating conditions, such as when the machine 10 is not level. Because cam gear 32 is supported on stub shaft 40, the cam shaft bearing that might otherwise be present at adjacent cam shaft thrust surface 68 may be eliminated for an engine 14 according to the present disclosure. Thus, no cam shaft bearing may be included at the external face of housing 16. Stub shaft 40 also includes a second thrust bearing face 46 that makes bearing the contact with a drive plate thrust surface 52 under certain operating conditions. Thus, the first thrust bearing face 44 and the second thrust bearing face 46 of stub shaft 40 serve to trap cam shaft 60 and its joined cam gear 32 from migrating too far along their common axis of rotation.

Although not necessary, stub shaft 40 may be bolted through an oil gallery cover plate 17 that helps to maintain proper fluid communication between various internal oil galleries of engine 14 that have openings around the periphery of cam shaft 60. FIG. 8 is again of interest for showing a potential lubrication path 19 for lubricating the bearing contact surface 41 between stub shaft 40 and cam gear 32. In particular, the lubricating oil may enter through a weep hole defined by stub shaft 40 and that opens into the bearing contact area 41. Some of the lubricating oil moves to the right and escapes between cam gear 32 and oil gallery cover plate 17, and another portion travels to the left and then downward between stub shaft 40 and drive plate 51. This lubricating oil then travels between cam shaft 60 and the inner surface of stub shaft 40 before returning to the interior of housing 16.

Figure 4:
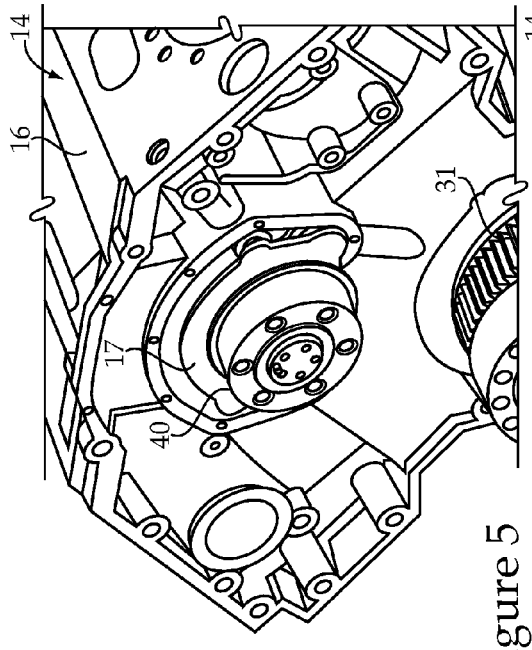
FIGS. 4-7 are a series of perspective views showing different assembly steps of a cam gear to the engine of FIGS. 2 and 3.
Figure 5:
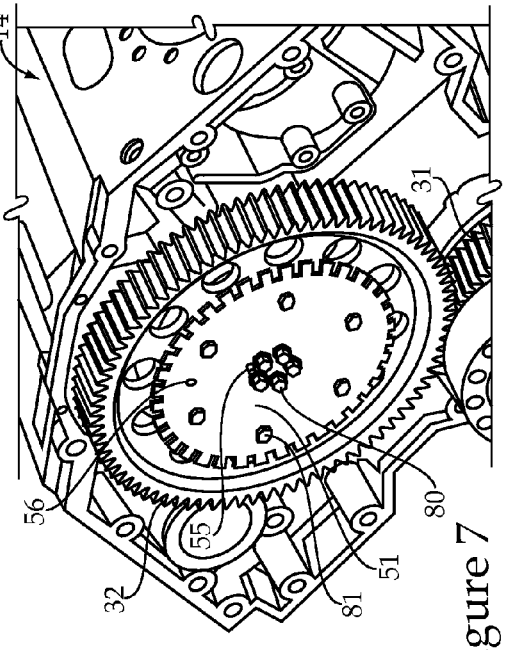
Figure 6:
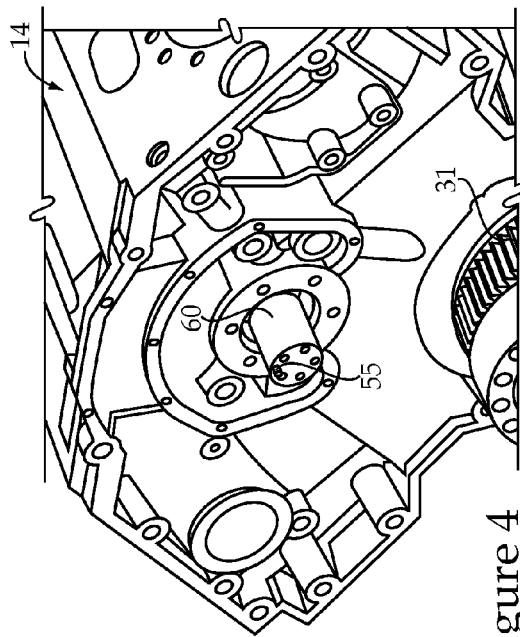
Figure 7:
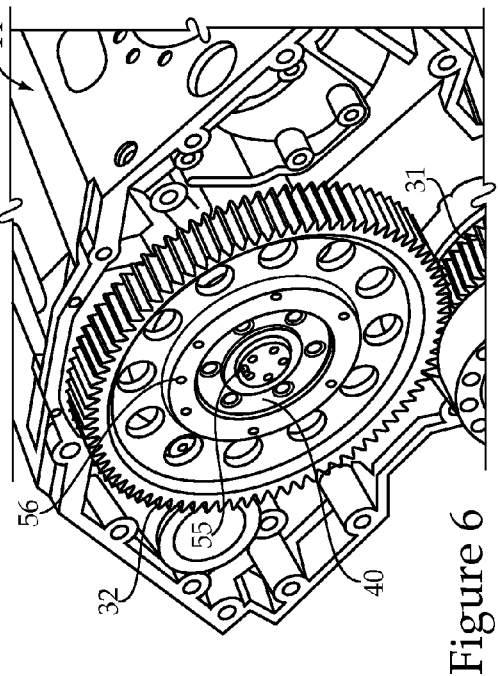

Referring now to FIGS. 4-7, the sequence of assembly of the cam gear 32 to cam shaft 60 is illustrated. FIG. 4 shows the exposed end of cam shaft 60 with locating dowel 55 protruding from its end. FIG. 5 shows a first step where the oil gallery cover plate and stub shaft 40 are bolted to housing 16. Stub shaft 50 may pilot into a cam shaft line bore defined by housing 16 and then be bolted to housing 16 as shown in FIG. 5. Next, cam gear 32 is slid over stub shaft 40 into proper position. FIG. 6 shows cam gear 32 with a locating dowel 56 protruding from its exposed face. The locating dowels 55 and 56 are used to properly orient the cam shaft 60 with regard to cam gear 32 by utilizing associated dowel holes on drive plate 51. FIG. 7 shows drive plate 51 bolted to cam shaft 60 with five centrally located cam shaft bolts 80, and also bolted with six cam gear bolts 81 to cam gear 32. As shown in FIG. 3, drive plate 51 may include a small protrusion that pilots on the inner surface of cam gear 32 and an inner indentation that pilots onto the end of cam shaft 60 as best shown in FIG. 3.

INDUSTRIAL APPLICABILITY

Figure 9:
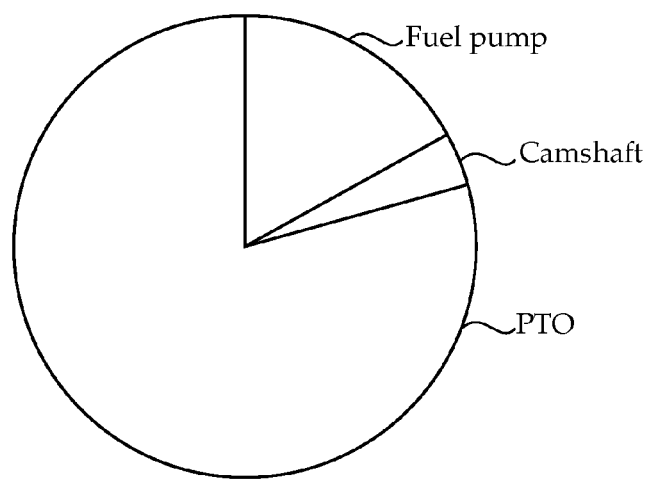
FIG. 9 is a pie chart showing distribution of power from the cam gear for the engine of FIG. 2.

The mounting and support strategy for a cam gear of an engine according to the present disclosure finds general applicability in any case where bearing support for the cam gear separate from the bearing support for the cam shaft may be desirable. One such instance is associated with the illustrated embodiment where the gear train 30 includes one or more powered gears 33 that are meshed with the cam gear 32 and receive power from the cam gear 32. The present disclosure is especially applicable where the crank gear 31 is meshed directly to the cam gear 32, and the powered gears 30 are meshed to the cam gear 32, resulting in a substantial side load on the cam gear 32. The disclosure also finds application in those cases where there may be a desire to avoid stress concentrations on a cam shaft for purposes of providing thrust bearing surfaces. Finally, the present disclosure finds specific applicability for engines for large machines 10 in which a majority of the power transmitted to the cam gear 32 from the crank gear 31 is in turn transmitted to one or more powered gears 33, and a minority of the power transferred from the crank gear 31 to the cam gear 32 is utilized to drive rotation of the underlying cam shaft 60. The power distribution for the specifically disclosed embodiment is illustrated in the pie chart of FIG. 9. As shown, only a small fraction of the total power transmitted to cam gear 32 from crank gear 31 is actually used to drive rotation of cam shaft 60. The majority of the power is utilized to power the hydraulic pumps that provide pressurized hydraulic fluid to implement(s) 13 of the machine, and a smaller fraction is used by the fuel pump gear 33 to pressurize fuel for injection into the engine combustion spaces.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine comprising:
 a machine body;
 an engine supported on the machine body;
 the engine including a housing and a gear train that includes a crank gear meshed with a cam gear that is meshed with at least one powered gear, and the cam gear is attached to a cam shaft by a drive coupler; and
 the cam shaft being rotationally supported in the housing on a plurality of bearings, and the cam gear being rotationally supported on a stub shaft with an inner surface out of contact with the cam shaft, but the stub shaft being attached to the housing.

2. The machine of claim 1 wherein the at least one powered gear is operably connected to drive a pump.

3. The machine of claim 2 wherein the at least one powered gear includes a fuel pump gear drive coupled to a high pressure common rail pump, and a power take off gear drive coupled to a hydraulic pump.

4. The machine of claim 1 wherein the stub shaft includes a thrust bearing face positioned for contact with a cam shaft thrust surface.

5. The machine of claim 4 wherein the drive coupler includes a drive plate bolted to both the cam shaft and the cam gear; and
 the stub shaft includes a second thrust bearing face positioned for contact with a drive plate thrust surface.

6. The machine of claim 4 wherein the drive coupler includes a spline.

7. The machine of claim 4 wherein the at least one powered gear includes a fuel pump gear drive coupled to a high pressure common rail pump, and a power take off gear drive coupled to a hydraulic pump.

8. The machine of claim 7 wherein the drive coupler includes a drive plate bolted to both the cam shaft and the cam gear; and
 the stub shaft includes a second thrust bearing face positioned for contact with a drive plate thrust surface.

9. A compression ignition engine comprising:
 a housing;
 a gear train that includes a crank gear meshed with a cam gear that is meshed with at least one powered gear, and the cam gear is attached to a cam shaft by a drive coupler;
 the cam shaft being rotationally supported in the housing on a plurality of bearings, and the cam gear being rotationally supported on a stub shaft with an inner surface out of contact with the cam shaft but the stub shaft being attached to the housing;

the stub shaft includes a thrust bearing face positioned for contact with a cam shaft thrust surface.

the at least one powered gear is operably connected to drive a pump; and a majority of power transferred to the cam gear from the crank gear being transmitted to the at least one powered gear to drive the pump, and a minority of the power being transmitted to drive rotation of the cam shaft.

10. The machine of claim 9 wherein the drive coupler includes a drive plate bolted to both the cam shaft and the cam gear; and the stub shaft includes a second thrust bearing face positioned for contact with a drive plate thrust surface.

11. The machine of claim 9 wherein the drive coupler includes a spline.

12. The machine of claim 9 wherein the at least one powered gear includes a fuel pump gear drive coupled to a high pressure common rail pump, and a power take off gear drive coupled to a hydraulic pump.

13. The machine of claim 12 wherein the drive coupler includes a drive plate bolted to both the cam shaft and the cam gear; and the stub shaft includes a second thrust bearing face positioned for contact with a drive plate thrust surface.

14. A method of operating a machine that includes an engine supported on the machine body; the engine including a housing and a gear train that includes a crank gear meshed with a cam gear that is meshed with at least one powered gear, and the cam gear is attached to a cam shaft by a drive coupler; the cam shaft being rotationally supported in the housing on a plurality of bearings, and the cam gear being rotationally supported on a stub shaft that has an inner surface out of contact with the cam shaft but the stub shaft being attached to the housing, the method comprising:

transferring power from the crank gear to the cam gear;

transmitting a majority of the power to the at least one powered gear from the cam gear, and transmitting a minority of the power to drive rotation of the cam shaft; and making thrust bearing contact between a thrust bearing surface of the stub shaft and a thrust surface of the cam shaft.

15. The method of claim 14 wherein the at least one powered gear includes a fuel pump gear and a power take off gear, the method further comprising:

powering a high pressure common rail pump from the fuel pump gear;

powering a hydraulic pump with the power take off gear.

16. The method of claim 15, further comprising making thrust bearing contact between a second thrust bearing surface of the stub shaft and a thrust surface of a drive plate of the drive coupler.

17. The method of claim 16, further comprising transmitting torque from the cam gear through the drive plate to the cam shaft.

18. The method of claim 17, further comprising pumping lubricant oil into the rotational contact area between the stub shaft and the cam gear.

* * * * *